March 21, 1950     C. A. BONVILLIAN ET AL     2,500,925
APPARATUS FOR THE COMBUSTION OF FUEL Filed March 13, 1943

FIG. I

March 21, 1950 C. A. BONVILLIAN ET AL 2,500,925
APPARATUS FOR THE COMBUSTION OF FUEL
Filed March 13, 1943 5 Sheets-Sheet 3

C. A. BONVILLIAN ET AL 2,500,925

APPARATUS FOR THE COMBUSTION OF FUEL

Filed March 13, 1943

WITNESSES.

INVENTORS.

March 21, 1950 C. A. BONVILLIAN ET AL 2,500,925
APPARATUS FOR THE COMBUSTION OF FUEL
Filed March 13, 1943 5 Sheets-Sheet 5

FIG. 8

Patented Mar. 21, 1950

2,500,925

UNITED STATES PATENT OFFICE 2,500,925

APPARATUS FOR THE COMBUSTION OF FUEL

Claude A. Bonvillian, Chattanooga, Tenn., Ralph C. Brierly, Narberth, Pa., and Samuel Letvin, Elmhurst, N. Y.

Application March 13, 1943, Serial No. 479,010

13 Claims. (Cl. 60—44)

(Granted under the act of March 3, 1883, as amended April 30, 1928; 370 O. G. 757)

This invention relates to the combustion of fuels.

The invention provides novel methods of, and apparatus for, the combustion of fuels, preferably at relatively high heat releases, and which are applicable to a wide variety of uses, such as gas turbine systems, vapor generators, vapor superheaters, the heating of fluids, and the rocket or jet propulsion of aircraft.

In one aspect, the invention contemplates the projection of fuel and primary air into a furnace wherein the fuel is ignited and forms a stream of burning fuel and gases, and the addition of secondary air to the periphery of the stream in the furnace in such manner that a contracting flame shape is obtained and combustion is completed in the earliest practicable time and in the minimum length of furnace, and a high degree of homogeneity with respect to temperature and constituents of the mixture flowing from the furnace is obtained. By proportioning the air introduced peripherally, the flame shape and the temperature of the gases may be controlled. These results are attained with minimum pressure drop through the furnace system and, because of the high heat release, in a manner conducive to extreme compactness and light weight, thereby imparting the characteristic of portability to the furnace.

It has been found entirely practicable to operate furnaces embodying the invention at heat releases on the order of ten million B. t. u. per cu. ft. per hour, and evidence is available that far higher releases are wholly practicable. Moreover, these furnaces posess wide flexibility, in consequence of which this heat liberation rate can be varied almost instantaneously through at least a ten to one range, for example, from one to ten million B. t. u. per cu. ft. per hour practically instantly. With furnaces embodying the invention and operating under constant firing conditions at the rates mentioned, it is possible to maintain temperatures of the gases flowing from the furnace within ±25° F. of a given figure, and to maintain $CO_2$ percentages within ±0.1%, with both substantially uniformly distributed across the exit end of the furnace. It is possible with this uniformity to operate continuously with furnace exit gas temperatures of at least 1800° F. The invention also permits the use of very high air preheats without jeopardizing the furnace or gas passages as evidenced by the fact that operations frequently have been conducted at air entrance temperatures of 600° F., and available data substantiate the fact that temperatures on the order of 1000° F. can be sustained advantageously. For these reasons, high power can be developed in furnaces of the invention which occupy no more than 2 or 3 cubic feet.

In another aspect of the invention, a suitable substance such as water, steam, gas, pulverized ore, chemicals, or the like, is introduced into the furnace into direct contact with the burning fuel and gas stream, either with or without preheating by the heat of the furnace. This arrangement is useful for contact superheating, contact distillation of chemical substances and contact smelting of pulverized ore, and also is useful for recycling of gases produced in the furnace. Further aspects of the invention will be mentioned hereinafter.

Apparatus embodying the invention requires no firebrick or refractory linings which customarily are employed in furnaces designed for operation at high heat releases in order to sustain combustion through the maintenance of high temperatures and radiant heat effects. In place thereof, heat resistant metal or equivalent material is employed and is cooled by the secondary air supplied to the furnace, or by other fluids. The metallic members are so constructed and arranged that they serve to shape the flame in the desired manner, to promote attainment of the maximum heat release, the maximum combustion speed, and the maximum homogeneity of gases leaving the furnace, not only in regard to temperature but also with respect to constituents. This arrangement is particularly advantageous where lightness of weight is required, and it avoids the erosion that may occur with firebrick or refractory linings with high velocities of air and gas, and which ordinarily results in the entrainment of particles which may have an abrasive action on turbine blading or cause deleterious results in portions of the system beyond the combustion chamber. Moreover, the ejection of incandescent particles of firebrick or refractory would be disadvantageous with aircraft because of the resultant increase of the visibility of the aircraft.

The invention will be understood from the following description when considered in connection with the accompanying drawings forming a part thereof, and in which.

Like characters of reference refer to the same or to similar parts throughout the several views.

Figure 1:
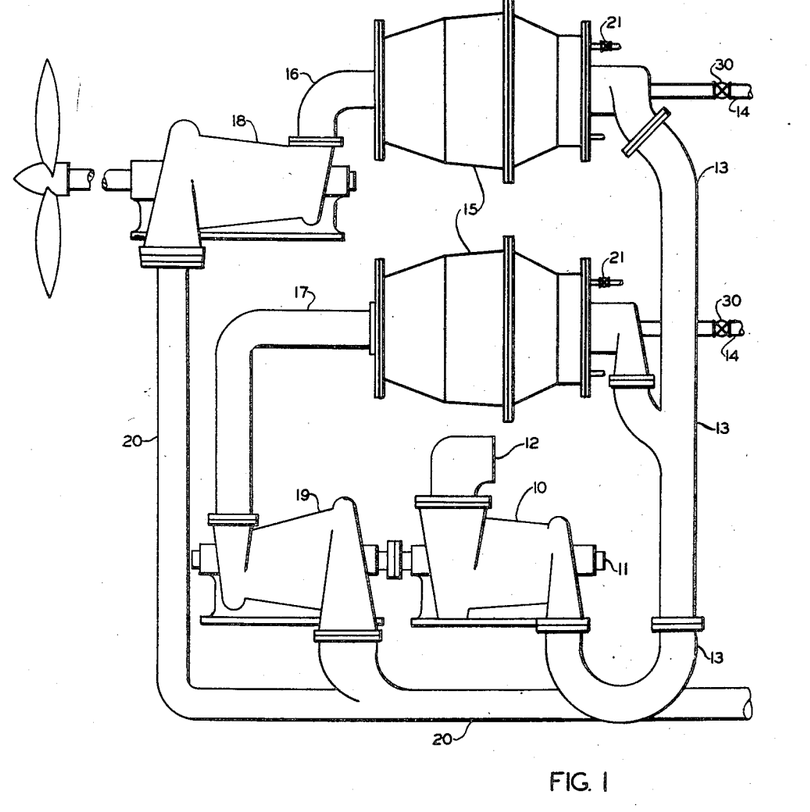
Fig. 1 is a more or less diagrammatic view in elevation, of a gas turbine system having furnaces embodying the invention.
Figure 2:
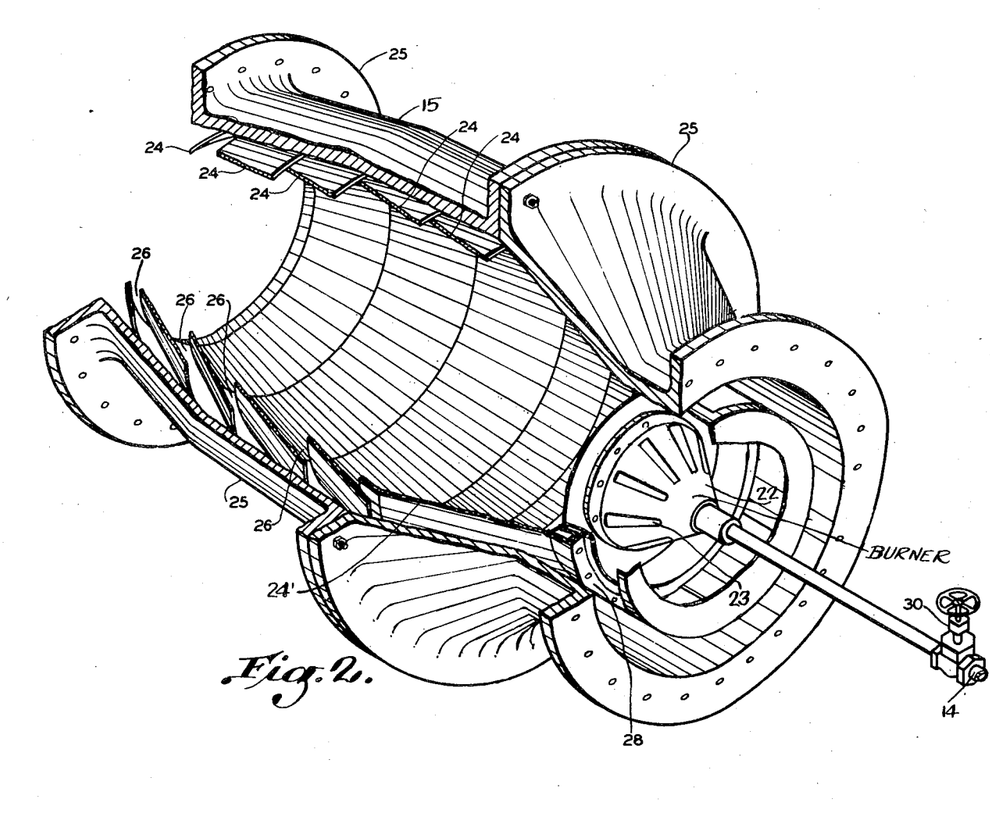
Fig. 2 is an isometric view, partly in section, of one of the furnaces shown in Fig. 1.

Referring to Figs. 1 and 2 of the drawings, the gas turbine system illustrated, utilizes two furnaces embodying the form of the invention shown in Fig. 2. In Fig. 1, reference character 10 designates an axial compressor which is put into operation through the rotation of its shaft 11 by any suitable means such as an electric motor or gasoline engine, not shown. Air drawn through the compressor suction 12 is compressed, and passes through the piping 13 to the inlet ends of the furnaces 15, in which fires are lighted by any suitable means, such as by torches or electrical devices. The fuel for the furnace 15 is introduced into the furnace, or is supplied to the one or more burners for firing the furnace, through fuel connections 14 which are controlled by valves 30. The mixture of the gases of combustion and air heated to a predetermined temperature, passes from the outlet ends of the furnace into the piping 16 and 17. The piping 16 which is connected to the outlet of one of the furnaces, passes to a gas turbine 18 which is designed to operate a propeller to provide the motive force for a vehicle, or to perform other useful work. The piping 17 which is connected to the outlet end of the other furnace 15, conducts the gases to another gas turbine 19 which is connected to and operates the axial compressor 10. Exhaust gases from the turbines 18 and 19, flow through the piping 20 to the atmosphere.

The form of the furnace 15 shown in Fig. 2, comprises an outer casing 25, a burner 22, and means within the casing providing the boundary of the combustion chamber for the furnace and arranged so that secondary air is supplied to the periphery of the burning fuel and gas stream at spaced intervals substantially throughout the chamber. The burner 22 is located at one end portion of the furnace, and primary air is supplied to the burner through louvers 23. The casing flares outwardly from the burner end for a short distance, and thereafter converges toward the outlet end of the furnace in two stages, the second of which converges somewhat more abruptly than the first. As shown, the boundary for the combustion chamber comprises a plurality of bands 24 spaced from the inner wall of the converging portion of the outer casing with their terminal portions disposed in overlapping but spaced relationship, to provide annular openings 26 through which secondary air is delivered to the periphery of the fuel and gas stream. The bands 24 are metallic rings with walls converging toward the outlet of the furnace. Secondary air is conducted from the burner end of the furnace to the space between these bands and the outer casing through an annular diverging passageway formed by the diverging portion of the casing and an elongated band 24', the inner and larger end portion of which is substantially cylindrical and is disposed within, and in spaced relationship to, the first band 24 from the burner end of the furnace. The band 24 at the outlet end of the furnace converges toward the outlet more sharply than the other bands and functions as a deflector to direct the air more inwardly of the furnace to insure that combustion is completed before the gases leave the combustion chamber, to prevent smoke, and also to provide greater homogeneity of the gas and air mixture flowing from the combustion chamber. Although the bands forming the boundary of the combustion chamber of the furnace illustrated in Fig. 2, are disposed in overlapping relationship, it will be understood that the bands may be arranged in non-overlapping relationship when desired.

In operation, fuel is introduced into the combustion chamber through the burner at one end thereof, and primary air is supplied to the burner through the louvers 23. Secondary air is supplied to the periphery of the fuel and gas stream through the annular openings 26 between the bands 24. The secondary air is directed into the combustion chamber substantially in the form of frusto-conical sheets with the bases of the cones disposed toward the burner end of the chamber. As a result, the flame is compressed and assumes a conical shape, combustion is completed quickly and in a short path of flow of the fuel, the gases of combustion are diluted, a relatively high degree of homogeneity with respect to the temperature and constituents of the gas mixture is obtained, and the heat release per unit volume reaches the high figures previously mentioned. The secondary air also cools the outer casing 25 and the bands 24 and 24', and thus prolongs the life of the furnace.

Figure 3:
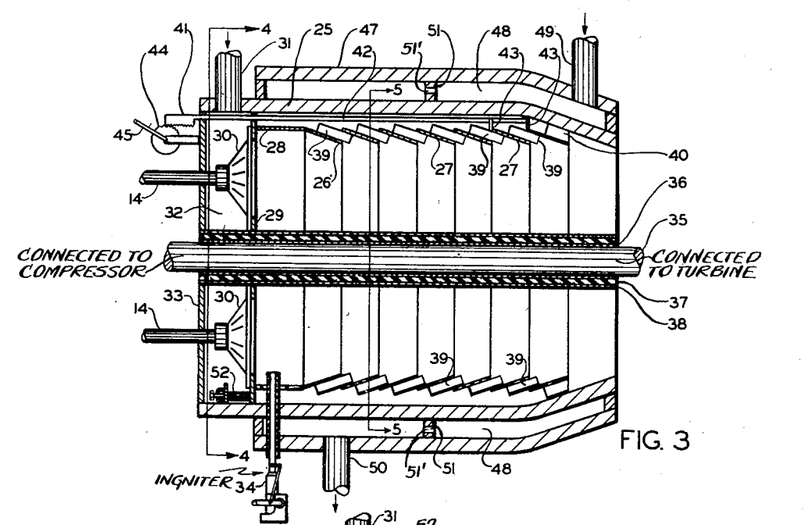
Fig. 3 is a longitudinal sectional view of another form of furnace.
Figure 4:
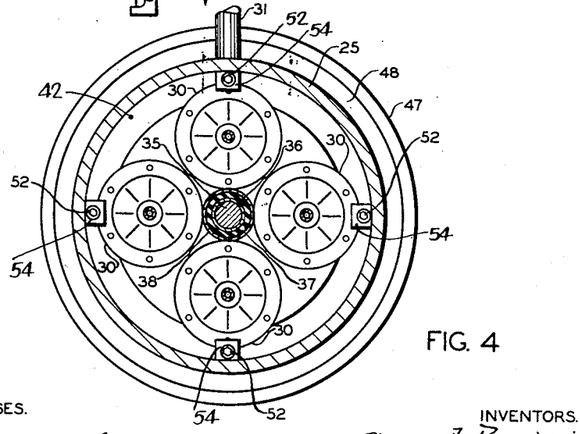
Fig. 4 is a transverse sectional view taken on line 4—4 of Fig. 3.
Figures 5, 6, 7:
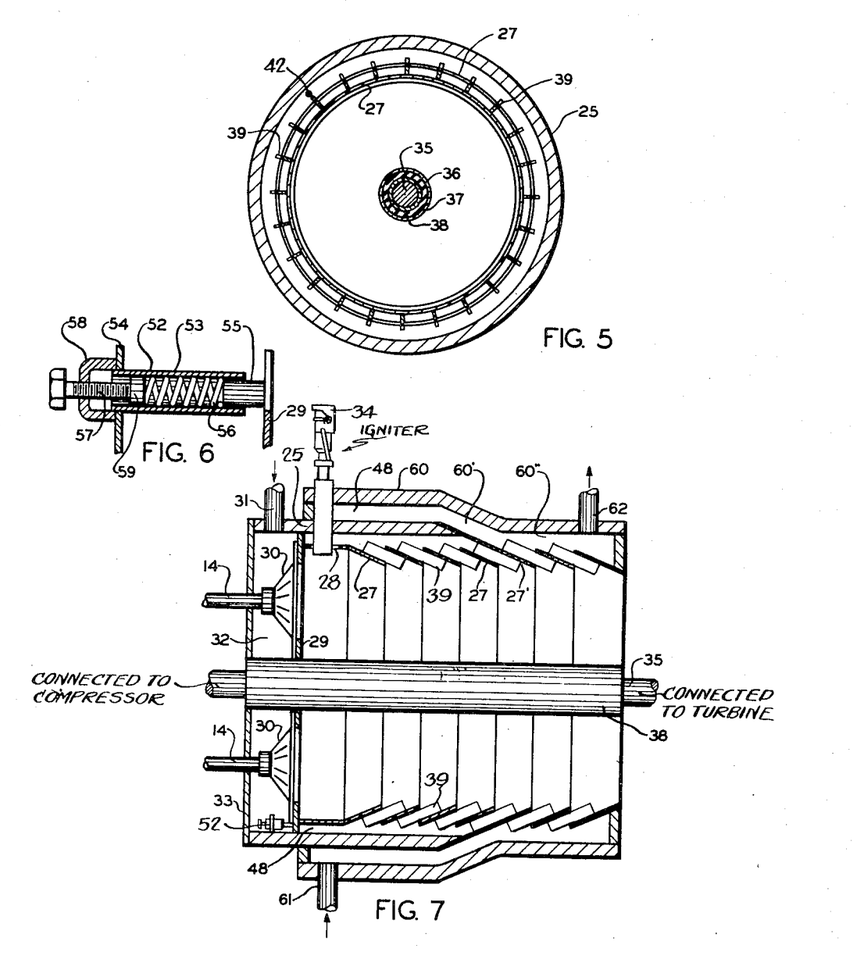
Fig. 5 is a sectional view taken on line 5—5 of Fig. 3.
Fig. 6 is a longitudinal sectional view, on an enlarged scale, of a part of the furnace shown in Fig. 3.
Fig. 7 is a longitudinal sectional view of another form of furnace.

The form of the invention shown in Figs. 3, 4 and 5 is particularly well adapted for installation between a compressor and a turbine in a gas turbine system, to eliminate the piping required for conducting air to the combustion chamber from the compressor and for conducting gas from the combustion chamber to the turbine, although it is not restricted to this use. This form of the invention also embodies other features which will be described hereinafter.

As shown in Figs. 3, 4 and 5, the furnace has a casing 25 of cylindrical form with an outlet end portion of gradually diminishing flow area. The combustion chamber is defined in part by a plurality of bands 27, each having its annular wall surface inclined inwardly toward the outlet end of the furnace, and all disposed in spaced relationship to the inner wall of the casing and to each other, with the outlet end of each band except the last, disposed adjacent the larger inlet end of the next band in the direction of flow of gases through the furnace. The first furnace band from the burner end of the furnace, designated 26' for convenience, has a cylindrical extension 28 which is secured to, or is in engagement with, a radial member 29 in the casing 25 and movable longitudinally therein, and which supports a plurality of fuel burners 30 arranged about the axis of the furnace. Radially outwardly of the extension 28, the member 29 has spaced projections between which air flows into the space between the casing 25 and the bands 26' and 27. Air is supplied to the burners through a conduit 31 which discharges into a chamber 32 between the member 29 and a plate 33. From the chamber 32, the air flows through the burners and also flows into the annular space between the bands 27 and the casing 25 for passage between the bands into the combustion chamber. The furnace is lighted off by a device 34 which will be described in detail hereinafter and which extends through an oval shaped aperture in the extension 28 to permit movement of the extension relative to the device.

When the form of furnace shown in Figs. 3, 4 and 5 is employed in a gas turbine system, the air compressor will be located adjacent the left hand end of the furnace as viewed in Fig. 3, and the gas turbine will be disposed adjacent the outlet end of the furnace. The turbine will drive a shaft 35 which passes axially through the furnace and drives the air compressor and any other devices requiring mechanical power. Drive shaft 35 is protected from the heat of the furnace by a metal shaft tube 36 and by any suitable insulation 37 and 38. Any other suitable means may be employed for protection of the shaft 35.

Heat is dissipated from the bands 27 to the surrounding air, or to the secondary air flowing over the bands and between them into the combustion chamber, by a plurality of metallic fins 39 which are fixed at intervals about the outer wall of each band and extend radially therefrom. These fins also function as spacing elements to maintain the bands in the desired spaced relationship to each other. Similar radiating fins 40 on the last band 27, engage the inner wall of the casing 25 and maintain this band in desired spaced relationship with the casing.

Figure 8:
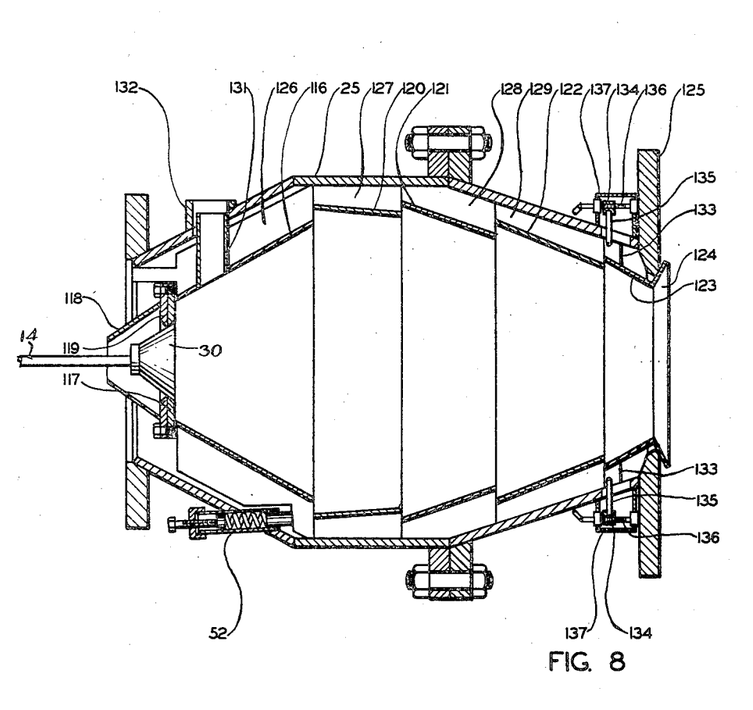
Fig. 8 is a longitudinal sectional view of a further form of furnace.

In order to vary, control, or apportion the secondary air flowing into the combustion chamber through one or more spaces between the bands 27 to change the shape and characteristics of the flame, any suitable means may be employed to alter the positions of the bands relative to each other. One such means is illustrated diagrammatically in Figs. 3 and 5, and comprises a rack 41 on, or connected to, the outer end of a rod 42 extending into the space between the bands and the casing 25 and having extensions 43 which are fixed to the last two bands 27, in the form shown. The rack 41 is actuated by a pinion 44 which is mounted on the furnace and is rotated by an operating device 45. While but one such adjusting means is shown, it will be understood that any suitable number may be employed, and that they may be arranged to move one, or more than one, band. Another means of adjustment, by reach rod actuated screws, is shown in Fig. 8 and will be described hereinafter.

A double casing is provided for the furnace shown in Figs. 3, 4 and 5. The outer casing 47 is spaced from the inner casing 25 to provide a jacket 48 for the dual purpose of cooling the inner casing and simultaneously heating the substance, such as water, steam, or chemicals, which is used for the purpose and is introduced through an inlet conduit 49 and is withdrawn through an outlet conduit 50. If concurrent flow of the substance with respect to the flow of gases is desired, the substance may be introduced through conduit 50 and withdrawn through conduit 49. Jacketed in this manner, the furnace may be used as a water heater, a boiler, a waste heat boiler, a superheater, or for any other purpose which does not require the substance heated to be in direct contact with the gases of combustion. For example, chemical substances for making smoke can be introduced into the jacket. As shown in Fig. 3, the jacket 48 is divided by a partition 51 which may function as an additional support for maintaining the two casings in proper spaced relationship. The partition may contain passages 51' to permit the flow of coolant from one side of the partition to the other.

Because of the high heat releases obtained in furnaces of the invention, the use of suitable means to take care of expansion and contraction is desirable, particularly when the furnaces are fired upwardly or horizontally. One such means, indicated generally 52, is shown in Figs. 3, 4 and 6, and comprises a cylinder 53 having one end fixed to a support 54 which is secured to the inner casing 25 in the air chamber 32, a piston 55 which projects from the other end of the cylinder 53 and engages the member 29, and a spring 56 disposed in the cylinder and which urges the piston outwardly of the cylinder toward the member 29. The force exerted by the spring on the piston is adjusted by a member 57 which is threaded into a yoke 58 and has a head 59 in the cylinder and in engagement with the spring. A plurality of the devices 52 are employed at intervals around the peripheral portion of the member 29. Upon expansion of the bands 27, the member 29 will move to the left as viewed in Fig. 3, and will move the pistons 55 against the spring 56. Upon contraction, the springs 56 will exert pressure on the member 29 and thus ensure that the bands 27 and the associated parts are retained in proper relationship regardless of expansions and contractions. Use of means for the accommodation of expansions and contractions of the furnace bands and related parts and the radiation and spacing fins 39, also facilitates erection of the furnace.

The form of the invention shown in Fig. 7 is similar to the form shown in Figs. 3, 4 and 5, with the exception that the substance employed as a coolant or for any other purpose, is introduced into direct contact with the gases in the combustion chamber after it has been heated in a jacket encompassing part of the furnace. Referring to Fig. 7, the inner casing 25 extends from the burner end of the furnace to a point about midway between the burner and outlet ends. Another casing 60 has a portion which surrounds the casing 25 in spaced relationship thereto, providing a furnace jacket 48, and another portion of about the same diameter as the inner casing and which provides an enclosure for the furnace at the outlet end portion thereof. The inner end of the inner casing 25 is secured to the outer and larger end of a furnace band 27' which is of greater axial length than the other bands 27. The intermediate portion of the casing 60 is of gradually decreasing flow area, as shown, and provides with the band 27' a passage 60' which connects the jacket 48 with the space 60" between the casing 60 and the bands 27. Coolant or other substance is introduced into the jacket 48 through a conduit 61. With this arrangement, the temperature of the coolant is first increased by its introduction into the jacket 48, and after flowing through the jacket, it flows through passage 60' into direct contact with the bands 27 and 27' at the outlet end portion of the furnace, and also flows between these bands into direct contact with the gases of combustion, passing into and intermixing with the gases. Water, steam, or other suitable substance, introduced into the jacket 48, cools the casing 25 without interfering with combustion in the combustion space, or in any manner retarding combustion, and thereafter passes into the combustion space of the furnace after combustion has been completed or substantially completed, thereby adding to the quantity of gas or substance flowing from the furnace. With this arrangement, the efficiency of a gas turbine cycle may be increased greatly, while at the same time the turbine itself will be cooled. Chemical substances may be injected into the jacket 48 and emerge with the products of combustion, in order to provide smoke screens for obscuration, or for any other similar or unrelated purpose. This arrangement also is useful for contact superheating, contact distillation of chemical substances and contact smelting of pulverized ore. An outlet conduit 62 provides an auxiliary connection from which the coolant or other substance introduced into the jacket may be withdrawn from the furnace for sampling, or for any other desired use.

Furnaces embodying the invention may be lighted off by any suitable means, such as by electrical spark, propane flames, glow-type lighters, or other devices.

In the form of furnace shown in Fig. 8, the outer casing 25 is similar to the casing of the furnace of Figs. 1 and 2. The combustion chamber is approximately ellipsoidal in shape and is formed by a plurality of bands which are disposed adjacent to each other and in spaced relationship with the casing 25. The burner end of the combustion chamber has a band 116 of hollow frusto-conical form and diverging toward the center of the chamber, and with a flange 117 at its smaller end to which a burner 30 is attached. A smaller frusto-conical member 118 having a flange 119, is secured to the smaller end of the band 116. A second band 120 having a slight inclination of its wall toward the outlet end of the furnace is disposed adjacent the band 116; a third band 121 somewhat wider than the band 120 and having a wall with a greater inclination toward the outlet end of the furnace is disposed adjacent the band 120; a fourth band 122 slightly wider than the band 121 and having a wall extending at about the same angle of inclination toward the outlet end of the furnace is located next to the band 121, and a fifth band 123 disposed next to the band 122, has a wall extending at a greater angle of inclination toward the outlet than the band 122, and is provided with an outwardly flaring portion 124 at its outlet end which extends beyond the outlet end 125 of the furnace casing. The several bands composing the combustion chamber are dimensioned so that the inlet end of each of the second to the fifth bands is of greater diameter than the outlet end of the next preceding band in the direction of flow of the gases through the chamber, to provide annular openings between the bands through which secondary air is delivered to the combustion chamber from the annular space between the bands and the casing. Each band is provided with spaced, radially extending and longitudinally disposed fins designated 126 to 129 respectively for each of the bands 116, 120, 121 and 122, which serve as heat radiating means and also as means properly to position the bands within the casing 25 through engagement of the outer ends of the fins with the inner wall of the casing, and with relation to each other through engagement of the fins of one band with the end of the next adjacent band, as shown. Means for observing combustion conditions near the burner end of the combustion chamber is provided by a tubular member 131 on band 116 which registers with a tubular member 132 on the casing 25. The bands are urged toward each other and toward the outlet end of the furnace, and expansions and contractions of the bands are provided for, by a plurality of devices 52, the spring pressed pistons of which engage the fins 126 of band 116.

Means are provided for adjusting the position of the band 123 with respect to the adjacent band 122. As shown, such means comprises fins 133 on the band 123, each of which is connected to an adjusting nut 134 by a link 135 which extends through an opening in the wall of the casing 25. Each nut 134 is threaded on a rotatable bolt 136 which has bearings at its ends in a housing 137 which seals the openings in the casing. Any suitable means, such as reach rods, may be employed to rotate the bolts 136 to move the band 123 in an axial direction toward or from the band 122 to increase or decrease the flow area of the annular opening between the bands.

Operation of the form of furnace shown in Fig. 8 is substantially the same as the operation of the furnace of Figs. 1 and 2.

The bands forming the combustion chambers of the several forms of furnaces disclosed herein, including the several loops or turns of the helix 103, may be of equal or different size and length, their walls may be disposed at the same angle or at different angles to the axis of the furnace, and their cross-sectional configuration may be plane or curved or irregular. Moreover, one or more bands may have one or more parts thereof of different diameters to provide a step-like cross-sectional configuration, in lieu of the other configurations mentioned. The relative quantities of secondary air introduced between adjacent bands is dependent upon the angle, length and general configuration of the bands, and the flow area of the openings between bands. Preferably, the bands and the air passages between them are so proportioned that combustion is completed in the earliest practicable time and in the minimum length of furnace, irrespective of high velocities of air, fuel, or both, and so that maximum homogeneity of the gas mixture and maximum progressive heat releases are obtained prior to the passage of the mixture beyond the end of the last band.

Preferably, the furnace bands, including the helix 103, are made of high temperature resistant alloy, such for example, as an alloy having 25% chromium and 20% nickel, or an alloy having 60% cobalt, 30% chromium and 10% molybdenum. The furnace outer casing 25 may be of a suitable metal having a lower percentage of constituents providing high heat resistance which may require none of these alloying materials, but is constructed sufficiently heavily to withstand any pressure of the air delivered thereto by the axial compressor or by other means.

Any means may be employed for firing the furnaces, other than the burners shown, including atomizers and registers, and more than one such means may be used, and located where desired with respect to the furnace and to each other. Any suitable combustible may be used for fuel for firing the furnace, such as oil, pulverized coal, gasoline or gas.

In lieu of, or in addition to, the spacers between the bands, such as bands 27 of the furnace, perforate plates may be employed to direct air, water, liquids, or gases through the openings between the bands, in order to impart heat or superheat to these fluids, or the bands themselves may be perforated for this purpose. With the perforations, flow directing devices may be utilized, if desired. In some instances, jets of suitable types disposed to discharge between the furnace bands may be preferred to the use of the perforate plates mentioned. Firing devices may likewise be installed in these areas.

Should the cooling of the furnace bands and casing and related parts present any difficulty, such as may occur with high preheat or with recycling, it may be desirable to employ firing devices for the furnace, or combustibles, or both, which are capable of producing blue flames, thus minimizing radiation, particularly in the initial stages of combustion near the firing end of the furnace. If desired, the furnace bands whether cooled by air or any suitable fluid may be plated with suitable metals such as cobalt, rhodium, ruthenium, or the like, and these plated surfaces may be polished on the inner or furnace sides to provide reflecting areas. Liners of similar materials may be employed in the event plating is impractical. By the use of such means, heat absorption of the furnace bands, casings and associated parts may be decreased materially.

Although in the forms of the invention selected for illustration, the furnace and the combustion chamber are cylindrical in cross section and have cylindrical or spiral walls, it will be understood that either the furnace or the combustion chamber, or both, may be square, polygonal, or of any other suitable geometrical cross-sectional configuration.

The word "substance" as used in the claims in connection with the introduction of a substance into direct contact with the burning fuel or gases of combustion in the combustion zone, includes within its scope any substance other than air which desirably may be so introduced, including but not limited to gas, water, steam, or a chemical.

This application is a continuation-in-part of application Serial No. 455,254, filed August 18, 1942, now abandoned.

The invention disclosed herein may be manufactured and used by or for the Government of the United States for government purposes without the payment of any royalty thereon.

It will be understood that changes may be made in the form, location and relative arrangement of the several parts of the furnaces and related equipment or devices disclosed herein, and changes may be made in the steps or in the sequence of steps of the methods disclosed, without departing from the principles of the invention. Accordingly, the invention is not to be limited excepting by the scope of the appended claims.

What is claimed is:

1. Apparatus for the combustion of fuel comprising a plurality of bands forming a combustion chamber, means for projecting fuel and primary air into the chamber wherein the fuel is ignited and forms a stream of burning fuel and gases, the bands having their end portions in spaced relationship to form continuous spaces encircling said stream, the spaces being of such dimension axially of the chamber that the air flows substantially no distance therein in passing from said passage to the chamber, means for introducing secondary air into the chamber through the spaces between the bands, means for maintaining the bands in spaced relationship, and means at one end of the combustion chamber for maintaining the bands in relationship to each other irrespective of expansions and contractions of the bands.

2. Apparatus for the combustion of fuel comprising a casing, a plurality of bands within the casing forming a combustion chamber, the bands being spaced from the inner wall of the casing to provide an air passage between the bands and the casing, adjacent bands having their end portions disposed in spaced relationship to provide an opening surrounding the combustion chamber and in direct communication with said air passage, means at one end of the combustion chamber for projecting fuel and primary air into the chamber wherein the fuel is ignited and forms a stream of burning fuel and gases, and means for introducing secondary air into said passage and into the combustion chamber through said openings, the band at said one end of the chamber having a wall which diverges toward the other end of the chamber, and each of the other bands having a wall which converges toward the other end of the chamber.

3. Apparatus for the combustion of fuel comprising a casing having a substantially cylindrical central portion and converging end portions, a plurality of bands within the casing forming a combustion chamber, the bands being spaced from the inner wall of the casing to provide an air passage between the bands and the casing, adjacent bands having their end portions disposed in spaced relationship to provide an opening surrounding the combustion chamber and in direct communication with said air passage, means for projecting fuel and primary air into the chamber wherein the fuel is ignited and forms a stream of burning fuel and gases, and means for introducing secondary air into said passage and into the combustion chamber through said opening, the bands having heat radiating fins extending radially therefrom and substantially parallel to the axis of the chamber and for approximately the full widths of the bands, said fins being in engagement with the inner wall of the casing with their outer end portions conforming substantially to the contour of the inner wall of the casing, the ends of the fins on one band being in engagement with the adjacent end of the adjacent band.

4. Apparatus for the combustion of fuel comprising a casing, a plurality of bands within the casing forming a combustion chamber, the bands being of different diameters, said diameters of the bands decreasing progressively from a point intermediate the opposite ends of the chamber toward one end thereof, the bands being spaced from the inner wall of the casing to provide an air passage between the bands and the casing, adjacent bands having their end portions disposed in spaced and non-overlapping relationship to provide an opening surrounding the combustion chamber and in direct communication with said air passage, the opening being of such dimension axially of the chamber that the air flows substantially no distance therein in passing from passage to the chamber, heat radiating means on the outside of said bands in contact with the interior of the casing and with another band, means for applying pressure to maintain the bands in contact with the heat radiating means on an adjacent band, means for projecting fuel and primary air into the chamber wherein the fuel is ignited and forms a stream of burning fuel and gases, and means for introducing secondary air into said passage and into the combustion chamber through said opening.

5. Apparatus for the combustion of fuel comprising a casing, a plurality of bands within the casing forming a combustion chamber, the bands being of different diameters, said diameters of the bands decreasing progressively from a point intermediate the opposite ends of the chamber toward said opposite ends, the bands being spaced from the inner wall of the casing to provide an air passage between the bands and the casing, adjacent bands having their end portions disposed in spaced and non-overlapping relationship to provide an opening surrounding the combustion chamber and in direct communication with said air passage, the opening being of such dimension axially of the chamber that the air flows substantially no distance therein in passing from the passage to the chamber, heat radiating means on the outside of said bands in contact with the interior of the casing and with another band, means for applying pressure to maintain the bands in contact with the heat radiating means on an adjacent band, means for projecting fuel and primary air into the chamber wherein the fuel is ignited and forms a stream of burning fuel and gases, and means for introducing secondary air into said passage and into the combustion chamber through said opening.

6. Apparatus for the combustion of fuel comprising a casing, a plurality of bands within the casing forming a combustion chamber, the bands being spaced from the inner wall of the casing to provide an air passage between the outer surface of the bands and the inner surface of the casing, adjacent bands having their end portions disposed in spaced and non-overlapping relationship to provide an opening surrounding the combustion chamber and in direct communication with said air passage, means for projecting fuel and primary air into the chamber wherein the fuel is ignited and forms a stream of burning fuel and gases, means for introducing secondary air into said passage and into the combustion chamber through said opening, the openings between adjacent bands being of such dimensions axially of the chamber that the air flows substantially no distance in passing from the passage to the chamber, heat radiating fins extending from the outer surface of said bands, the fins of one band being in contact with an adjacent band to maintain the bands in spaced relationship, and means for applying pressure to maintain the bands in contact with said fins on an adjacent band; so that the air delivered to the chamber from the air passage flows in the form of a plurality of spaced, frusto-conical sheets with the bases of the cones facing said means for projecting fuel into the chamber, whereby the flame produced by the burning fuel and gases is compressed and is caused to assume a substantially conical shape, combustion is completed in the combustion chamber, and a relatively high degree of homogeneity with respect to the temperatures and constituents of the gas mixture is obtained.

7. Apparatus for the combustion of fuel comprising a casing, a plurality of frusto-conical shaped bands within the casing forming a combustion chamber, the bands being spaced from the inner wall of the casing to provide an air passage between the bands and the casing, adjacent bands having their end portions disposed in spaced and non-overlapping relationship to provide a continuous opening surrounding the combustion chamber and in direct communication with said air passage, the opening being of such dimension axially of the chamber that the air flows substantially no distance therein in passing from the passage to the chamber, heat radiating fins on the outside of said bands extending generally parallel to the longitudinal axis of the chamber and constructed and arranged to maintain the bands in spaced relationship, the fins on one band being adapted to engage the rim of the wall at the end of the adjacent band, spring actuated means engaging the fins and maintaining said fins in engagement with said rim, means for projecting fuel and primary air into the chamber wherein the fuel is ignited and forms a stream of burning fuel and gases, and means for introducing secondary air into said passage and into the combustion chamber through said opening.

8. Apparatus for the combustion of fuel comprising a casing, a plurality of frusto-conical shaped bands within the casing forming a combustion chamber, the bands being spaced from the inner wall of the casing to provide an air passage between the bands and the casing, adjacent bands having their end portions disposed in spaced and non-overlapping relationship to provide a continuous opening surrounding the combustion chamber and in direct communication with said air passage, the opening being of such dimension axially of the chamber that the air flows substantially no distance therein in passing from the passage to the chamber, heat radiating fins on the outside of said bands extending generally parallel to the longitudinal axis of the chamber and constructed and arranged to maintain the bands in spaced relationship, the fins on one band being adapted to engage the rim of the wall at the end of the adjacent band, resilient means engaging the fins and adapted to maintain the fins in engagement with said rim during expansion and contraction of said bands, means for projecting fuel and primary air into the chamber wherein the fuel is ignited and forms a stream of burning fuel and gases, and means for introducing secondary air into said passage and into the combustion chamber through said opening.

9. Apparatus for the combustion of fuel comprising a casing, a plurality of frusto-conical shaped bands within the casing forming a combustion chamber, the bands being of different diameters, said diameters of the bands decreasing progressively from a point intermediate the opposite ends of the chamber toward said opposite ends, the bands being spaced from the inner wall of the casing to provide an air passage between the bands and the casing, adjacent bands having their end portions disposed in spaced and non-overlapping relationship to provide a continuous opening surrounding the combustion chamber and in direct communication with said air passage, the opening being of such dimension axially of the chamber that the air flows substantially no distance therein in passing from the passage to the chamber, heat radiating fins on the outside of said bands extending generally parallel to the longitudinal axis of the chamber and constructed and arranged to maintain the bands in spaced relationship, the fins on one band being adapted to engage the rim of the wall at the end of the adjacent band, means for projecting fuel and primary air into the chamber wherein the fuel is ignited and forms a stream of burning fuel and gases, and means for introducing secondary air into said passage and into the combustion chamber through said opening.

10. Apparatus for the combustion of fuel comprising a casing, a plurality of frusto-conical shaped bands within the casing forming a combustion chamber, the bands being of different diameters, said diameters of the bands decreasing progressively from a point intermediate the opposite ends of the chamber toward said opposite ends, the bands being spaced from the inner wall of the casing to provide an air passage between the bands and the casing, adjacent bands having their end portions disposed in spaced and non-overlapping relationship to provide an opening surrounding the combustion chamber and in direct communication with said air passage, the opening being of such dimension axially of the chamber that the air flows substantially no distance therein in passing from the passage to the chamber, heat radiating fins on the outside of said bands extending generally parallel to the longitudinal axis of the chamber, the fins on one band being adapted to engage the rim of the wall at the end of the adjacent band, means for projecting fuel and primary air into the chamber wherein the fuel is ignited and forms a stream of burning fuel and gases, and means for introducing secondary air into said passage and into the combustion chamber through said opening.

11. Apparatus for the combustion of fuel comprising a plurality of frusto-conical shaped bands forming a combustion chamber, adjacent bands having their end portions disposed in spaced and non-overlapping relationship to provide an opening surrounding the combustion chamber, burner means for projecting fuel and primary air into the chamber wherein the fuel is ignited and forms a stream of burning fuel and gases, heat radiating fins extending from the outer surface of said bands, the fins of one band being in contact with an adjacent band to maintain the bands in spaced relationship, means for applying pressure to maintain the bands in contact with said fins on an adjacent band, a casing surrounding the combustion chamber in spaced relationship to said bands and extending from the burner end thereof to a point short of the outlet end, means for introducing secondary air into the annular passage between the casing and the bands and into the combustion chamber through the openings between bands, the openings between adjacent bands being of such dimensions axially of the chamber that the air flows substantially no distance in passing from said annular passage into the chamber, the bands being spaced apart so that the air delivered to the chamber from the air passage flows in the form of a plurality of spaced, frusto-conical sheets with the bases of the cones facing said burner means, a second casing having a portion thereof surrounding the first mentioned casing in spaced relationship therewith to provide a jacket between said casings and having another portion surrounding the outlet end portion of the chamber in spaced relationship with the bands thereof and having an intermediate portion providing part of a passage connecting the jacket and the space between said other portion of the second casing and the bands enclosed thereby, and means for introducing a substance into the jacket for flow therethrough and through said passage into the combustion chamber through the openings between the bands in the outlet portion of the chamber.

12. Apparatus for the combustion of fuel comprising a plurality of frusto-conical shaped bands forming a combustion chamber, adjacent bands having their end portions disposed in spaced and non-overlapping relationship to provide an opening surrounding the combustion chamber, burner means for projecting fuel and primary air into the chamber, wherein the fuel is ignited and forms a stream of burning fuel and gases, heat radiating fins extending from the outer surface of said bands, the fins of one band being in contact with an adjacent band to maintain the bands in spaced relationship, means for applying pressure to maintain the bands in contact with said fins on an adjacent band, a casing surrounding the combustion chamber in spaced relationship to said bands and extending from the burner end thereof to a point short of the outlet end, means for introducing secondary air into the annular passage between the casing and the bands and into the combustion chamber through the openings between bands, the openings between adjacent bands being of such dimensions axially of the chamber that the air flows substantially no distance in passing from said annular passage into the chamber, the bands being spaced apart so that the air delivered to the chamber from the air passage flows in the form of a plurality of spaced, frusto-conical sheets with the bases of the cones facing said burner means, a second casing having a portion thereof surrounding the outlet end portion of the chamber in spaced relationship with the bands thereof, and means for introducing a substance into the second casing and into the combustion chamber through the openings between the bands in the outlet portion of the chamber.

13. Apparatus for the combustion of fuel comprising a plurality of frusto-conical shaped bands forming a combustion chamber, adjacent bands having their end portions disposed in spaced and non-overlapping relationship to provide an opening surrounding the combustion chamber, burner means for projecting fuel and primary air into the chamber wherein the fuel is ignited and forms a stream of burning fuel and gases, heat radiating fins extending from the outer surface of said bands, the fins of one band being in contact with an adjacent band to maintain the bands in spaced relationship, means for applying pressure to maintain the bands in contact with said fins on an adjacent band, a casing surrounding the combustion chamber in spaced relationship to said bands and extending from the burner end thereof to a point short of the outlet end, means for introducing secondary air into the annular passage between the casing and the bands and into the combustion chamber through the openings between bands, the openings between adjacent bands being of such dimensions axially of the chamber that the air flows substantially no distance in passing from said annular passage into the chamber, the bands being spaced apart so that the air delivered to the chamber from the air passage flows in the form of a plurality of spaced, frusto-conical sheets with the bases of the cones facing said burner means, a second casing having a portion thereof surrounding the first mentioned casing in spaced relationship therewith to provide a jacket between said casings, and means for introducing a substance into the jacket for flow therethrough and into the combustion chamber through the openings between the bands in the outlet portion of the chamber.

CLAUDE A. BONVILLIAN.
RALPH C. BRIERLY.
SAMUEL LETVIN.

REFERENCES CITED

The following references are of record in the file of this patent:

UNITED STATES PATENTS

| Number | Name | Date |
|---|---|---|
| 710,130 | Weiss | Sept. 30, 1902 |
| 972,504 | Brown | Oct. 11, 1910 |
| 974,216 | Voegeli | Nov. 1, 1910 |
| 1,082,815 | Melas | Dec. 30, 1913 |
| 1,550,007 | Ciraolo | Aug. 18, 1925 |
| 1,828,784 | Perrin | Oct. 27, 1931 |
| 2,101,270 | Rice | Dec. 7, 1937 |
| 2,206,553 | Nagel | July 2, 1940 |
| 2,247,296 | Holtam | June 24, 1941 |
| 2,268,464 | Seippel | Dec. 30, 1941 |
| 2,332,866 | Müller | Oct. 26, 1943 |

FOREIGN PATENTS

| Number | Country | Date |
|---|---|---|
| 20,604 | Great Britain | Sept. 25, 1903 |
| 539,069 | Great Britain | Aug. 27, 1941 |